United States Patent [19]

Johnston et al.

[11] Patent Number: 5,070,970
[45] Date of Patent: Dec. 10, 1991

[54] MULTI-TUBE SHOCK ABSORBER

[75] Inventors: Gary L. Johnston, Pleasant Hill; William C. Kruckemeyer, Xenia; Richard E. Longhouse, Dayton, all of Ohio

[73] Assignee: General Motors Corporation, Detroit, Mich.

[21] Appl. No.: 542,379

[22] Filed: Jun. 22, 1990

[51] Int. Cl.$^5$ ............................................. F16F 9/00
[52] U.S. Cl. .................................. 188/315; 188/318; 188/322.19
[58] Field of Search ............... 188/315, 314, 318, 320, 188/286, 322.19

[56] References Cited

U.S. PATENT DOCUMENTS

| | | | |
|---|---|---|---|
| 2,025,199 | 12/1935 | Funston | 188/315 |
| 2,048,037 | 7/1936 | Smith | 188/318 X |
| 3,078,967 | 2/1963 | Brown et al. | 188/314 X |
| 3,127,958 | 4/1964 | Szostak | 188/318 X |
| 3,966,030 | 6/1976 | Sirven | 188/318 |
| 4,702,356 | 10/1987 | Katz et al. | 188/315 |
| 4,828,229 | 6/1989 | Fannin et al. | 267/64.25 |

Primary Examiner—Robert J. Oberleitner
Assistant Examiner—Josie A. Ballato
Attorney, Agent, or Firm—A. Michael Tucker

[57] ABSTRACT

A hydraulic damper for a suspension system comprises a fluid-filled inner cylinder mounting a reciprocating piston and piston rod. The piston divides the interior of the inner cylinder into upper and lower chambers. A reservoir tube surrounds the inner cylinder and forms a reservoir in the interior volume between the reservoir tube and the inner cylinder. A base valve assembly permits the return of fluid into the lower chamber from the reservoir. A pair of concentric tubes are mounted between the inner cylinder and the reservoir tube and provide a one-way laminar flow path for fluid exiting the upper chamber of the inner cylinder and entering the reservoir. The length and the spacing of the concentric tubes can be varied to provide a preselected damping force.

4 Claims, 1 Drawing Sheet

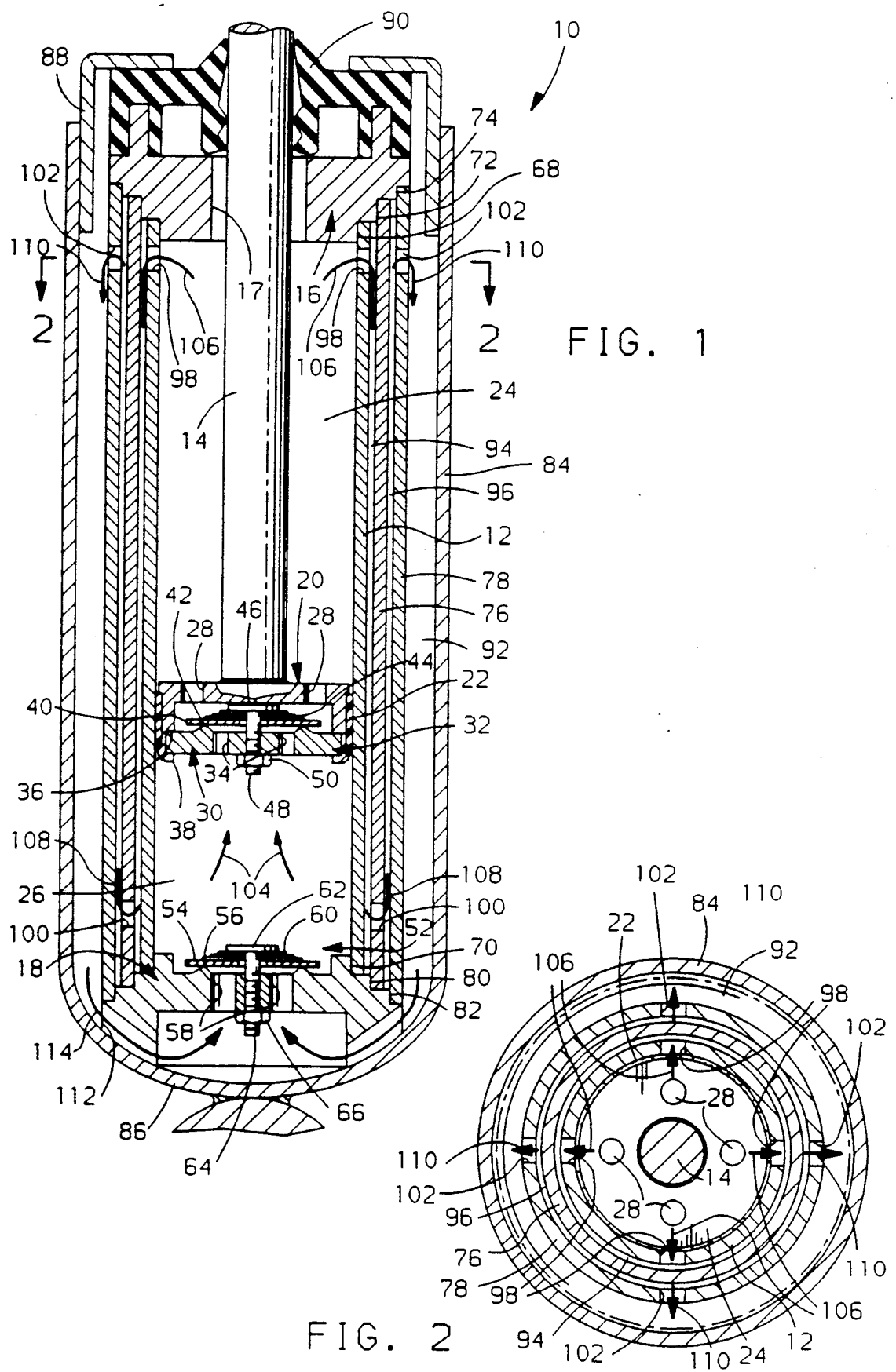

MULTI-TUBE SHOCK ABSORBER

BACKGROUND OF THE INVENTION

1. Field of the Invention

The present invention relates generally to hydraulic dampers for vehicular suspension systems and, in particular, is concerned with a mono-flow shock absorber having a flow path formed by concentric tubes.

2. Statement of the Related Art

Hydraulic dampers for suspension systems are well-known. Many dampers utilize a reciprocating piston rod and piston in a fluid-filled cylinder. A valving assembly carried by the piston varies the resistance to fluid flow between first and second chambers in the cylinder. A separate valving assembly is utilized to control fluid flow between the cylinder and a fluid reservoir.

The art continues to seek improvements. It is desirable to provide an economical damper for use with a suspension system. Preferably, hydraulic fluid traveling through a damper during operation will do so at low noise levels. Lower operating noise levels for dampers are desirable for customer satisfaction.

SUMMARY OF THE INVENTION

The present invention includes a hydraulic damper for a suspension system. The damper provides a one-way fluid flow path between concentric tubes mounted between an inner cylinder and a reservoir tube. The mono-flow shock absorber reduces operating noise by providing a laminar fluid flow path between the concentric tubes. The damping force provided by the present invention can be selected by varying the length and spacing of the concentric tubes.

In a preferred embodiment, the present invention includes a hydraulic damper for a suspension system. The damper comprises a fluid-filled inner cylinder mounting a reciprocating piston and piston rod. The piston divides the interior of the inner cylinder into upper and lower chambers. A reservoir tube surrounds the inner cylinder and forms a reservoir in the interior volume between the reservoir tube and the inner cylinder. A base valve assembly permits the return of fluid into the lower chamber from the reservoir. A pair of concentric tubes are mounted between the inner cylinder and the reservoir tube and provide a one-way laminar flow path for fluid exiting the upper chamber of the inner cylinder and entering the reservoir. The length and the spacing of the concentric tubes can be varied to provide a preselected damping force.

BRIEF DESCRIPTION OF THE DRAWINGS

FIG. 1 is an axial sectional view of a shock absorber according to the present invention incorporating first and second tubes between an inner cylinder and a reservoir tube which provide a laminar flow path for hydraulic fluid.

FIG. 2 is a sectional view taken along line 2—2 of FIG. 1 illustrating radially spaced-apart fluid ports provided in an inner cylinder and a second tube.

DETAILED DESCRIPTION OF THE PREFERRED EMBODIMENT

A shock absorber constructed according to the present invention is indicated generally at 10 in FIG. 1. The shock absorber 10 is a multi-tube hydraulic damper containing a predetermined quantity of hydraulic fluid and is intended for use in a conventional vehicular suspension system.

The shock absorber 10 includes an inner cylinder 12 for receiving a reciprocating piston rod 14. At its upper end, the inner cylinder 12 is closed by a stepped rod guide 16 having a central opening 17 for receiving the piston rod 14. At its lower end, the inner cylinder 12 is closed by a stepped cylinder end 18.

A cylindrical piston 20 is provided at the lower end of the piston rod 14. The piston 20 can be welded to the piston rod 14 as illustrated or it can be attached by any suitable means. A circumferential seal 22, preferably formed from polytetrafluoroethylene, is provided about the piston 20. As the piston rod 14 reciprocates, the piston seal 22 is slidable against the inner diameter of the inner cylinder 12.

The piston 20 divides the interior volume of the inner cylinder 12 into an upper chamber 24 and a lower chamber 26. A plurality of fluid passages 28 are provided in the piston 20 to permit fluid to pass from the lower chamber 26 to the upper chamber 24 as described below.

A piston valving assembly indicated generally at 30 is secured on the piston 20 to control the one-way flow of fluid through the piston passages 28. The piston valving assembly 30 includes a cylindrical orifice plate 32 having a plurality of fluid passages 34. The orifice plate 32 is secured to the piston 20 between an inner locator shoulder 36 and a radially inwardly coined annular skirt 38. A valve disk 40 is mounted on a seat 42 provided on an upper surface of the orifice plate 32. A spring 44 is confined between the valve disk 40 and a flange 46 on a centralized threaded rivet 48 secured to the orifice plate 32 by a nut 50. The valve disk 40 deflects upwardly as fluid passes through the orifice plate passages 34 and piston passages 28 into the upper chamber 24 as described below.

A base valving assembly indicated generally at 52 is mounted on an upper surface of the cylinder end 18 to control the one-way flow of fluid into the lower chamber 26. A valve disk 54 is mounted on a seat 56 provided on an upper surface of the cylinder end 18 and deflects upwardly as fluid passes through passages 58 into the lower chamber 26 as described below. A spring 60 is confined between the valve disk 54 and a flange 62 on a centralized threaded rivet 64 secured to the cylinder end 18 by a nut 66.

The inner cylinder 12 is press fitted at its upper end to a first annular step 68 provided in the rod guide ;16. A complementary first annular step 70 in the cylinder end 18 receives the lower end of the inner cylinder 12. Second and third steps 72, 74 in the rod guide 16 receive the respective upper ends of first and second tubes 76, 78. The lower ends of the tubes 76, 78 are received in corresponding second and third steps 80, 82 in the cylinder end 18. The tubes 76, 78 are mounted concentrically about the piston rod 14 and the inner cylinder 12.

A reservoir tube 84 having a closed lower end 86 surrounds the rod guide 16, cylinder end 18 and the tube 78. The reservoir tube 84 is sealed at its upper end by an end cap 88. An elastomeric seal 90 is fitted adjacent the end cap 88, the rod guide 16 and the piston rod 14 to seal the shock absorber 10. A fluid reservoir 92 is formed between the reservoir tube 84 and the second tube 78.

A first annular chamber 92 is formed between and bounded by the inner cylinder 12 and the first tube 76. A second annular chamber 96 is formed between and bounded by the first tube 76 and the second tube 78. A plurality of radially spaced-apart ports 98 are provided adjacent the upper end of the inner cylinder 12 to provide fluid communication between the upper chamber 24 and the first annular chamber 94. A plurality of radially spaced-apart fluid ports 100 are provided adjacent the lower end of the first tube 76 to provide fluid communication between the first annular chamber 94 and the second annular chamber 96. A plurality of radially spaced-apart ports 102 are provided adjacent the upper end of the second tube 78 to provide fluid communication between the second annular chamber 96 and the fluid reservoir 92.

In operation, the shock absorber 10 acts as a monoflow hydraulic damper. During a compression stroke, i.e., when the piston rod 14 and piston 20 move downwardly toward the base valving assembly 52, the fluid in the lower chamber 26 indicated at directional arrows 104 moves upwardly through the piston valving assembly 30 and passages 28 as described above to the upper chamber 24. Fluid in the upper chamber 24 passes through ports 98 as indicated at directional arrows 106. Fluid in the first annular chamber 94 passes to the second annular chamber 96 through ports 100 as indicated at directional arrows 108 and then to the reservoir 92 through ports 102 as indicated at directional arrows 110. Fluid in the reservoir 92 returns to the lower chamber through ports 112 in the cylinder end 18 and the base valve assembly 52 as indicated by directional arrows 114.

A particular aspect of the shock absorber 10 involves the fluid flow path formed in the first and second annular chambers 94, 96. The clearance between the first and second tubes 76, 78 and the length of annular chambers 94, 96 can be selected to provide a laminar fluid flow path, i.e., a path having a Reynolds No. less than 2000. Laminar flow tends to reduce operating noise levels in a damper and is therefore desirable. The mono-flow shock absorber decreases the tendency of fluid aeration and provides more uniform heat distribution than conventional bi-flow dampers. Furthermore, the length and spacing of the annular chambers 94, 96 can be varied to provide a preselected damping force, thereby replacing standard rebound and compression valving used in the prior art.

Although the present invention has been described with reference to a preferred embodiment, workers skilled in the art will recognize that changes may be made in form and detail without departing from the spirit and scope of the invention.

We claim:
1. A hydraulic damper comprising:
   (a) a fluid-filled inner cylinder having fluid ports adjacent its upper end;
   (b) a reciprocating piston and piston rod slidably mounted in the inner cylinder, wherein the piston divides the inner cylinder into upper and lower chambers;
   (c) piston valving means mounted on the piston for controlling the flow of fluid from the lower chamber to the upper chamber;
   (d) rod guide means for closing the upper end of the inner cylinder;
   (e) cylinder end means for closing the lower end of the inner cylinder and mounting base valve means for controlling the flow of fluid into the lower chamber;
   (f) a plurality of spaced-apart tubes concentrically mounted about the inner cylinder including
      (i) a first tube concentrically mounted about the inner cylinder having fluid ports adjacent the base valve means; and
      (ii) a second tube concentrically mounted about the first tube and having fluid ports adjacent the rod guide means; and
   (g) a reservoir tube surrounding the inner cylinder and cooperating with the second tube to form a fluid reservoir; and
   (h) a plurality of annular fluid chambers provided between the inner cylinder and the tubes in fluid communication with the upper chamber to provide a flow path for fluid exiting the upper chamber and entering the fluid reservoir.

2. The damper as specified in claim 1 wherein the cylinder and means includes:
   (a) three annular concentric steps for receiving the inner cylinder and the first and second tubes; and
   (b) ports for permitting the return of fluid from the reservoir to the lower chamber of the inner cylinder.

3. The damper as specified in claim 1 wherein the rod guide means includes three annular concentric steps for receiving the inner cylinder and the first and second tubes.

4. A hydraulic damper for a suspension system comprising:
   (a) a fluid-filled cylinder closed at its upper and lower ends;
   (b) a reciprocating piston slidably mounted in the cylinder so as to divide the interior of the cylinder into upper and lower chambers;
   (c) piston valving means for controlling the flow of fluid from the lower chamber to the upper chamber as the piston reciprocates;
   (d) at least first and second tubes concentrically mounted about the cylinder so that first and second annular fluid chambers are formed between the cylinder and the first tube and between the first and second tubes, respectively;
   (e) a reservoir tube concentrically mounted about the second tube so that a fluid reservoir is formed between the second tube and the reservoir tube;
   (f) base valve means for controlling the flow of fluid from the reservoir into the lower chamber as the piston reciprocates;
   (g) port means provided in the cylinder adjacent its upper end for directing the fluid from the upper chamber to first annular chamber;
   (h) port means provided in the first tube adjacent the cylinder lower end for directing the fluid from the first annular chamber to the second annular chamber; and
   (i) port means provided in the second tube adjacent the cylinder upper end for directing fluid from the second annular chamber to the reservoir.

* * * * *